April 3, 1973 D. B. RUPPEL ET AL Re. 27,612

JET SPRAY TANK CLEANER

Original Filed July 8. 1969 2 Sheets-Sheet 1

United States Patent Office

Re. 27,612
Reissued Apr. 3, 1973

27,612
JET SPRAY TANK CLEANER

Donald B. Ruppel, Akron, and Norman E. Reinhart, Cuyahoga Falls, Ohio, and Lee F. Stalker, Louisville, Ky., assignors to The B. F. Goodrich Company, New York, N.Y.

Original No. 3,599,871, dated Aug. 17, 1971, Ser. No. 839,896, July 8, 1969. Application for reissue Dec. 9, 1971, Ser. No. 206,350
Int. Cl. B05b *3/10*
U.S. Cl. 239—227 9 Claims

Matter enclosed in heavy brackets [ ] appears in the original patent but forms no part of this reissue specification; matter printed in italics indicates the additions made by reissue.

ABSTRACT OF THE DISCLOSURE

A portable high pressure jet spray cleaning apparatus with collapsible features for use in cleaning the agitator blades and the interior surfaces of tanks and vessels utilizing a plurality of rotatable high-pressure spray nozzles which rotate in a changing geometrical pattern for directing a high pressure stream of fluid against the interior wall surfaces of tanks and vessels.

BACKGROUND OF THE INVENTION

This invention relates to a high-pressure cleaning device and more particularly to a portable jet spray cleaning apparatus which directs a high pressure stream of fluid against the interior surfaces within chemical processing vessels.

In the chemical processing industry various storage and processing vessels are utilized which must be periodically cleaned. Interior surfaces of such tanks or vessels can be glass lined or of stainless steel which surfaces invariably become contaminated and fouled due to the chemicals processed therein. In polymerization of polyvinyl chloride, for example, cleaning of processing vessels is necessary after the completion of each batch polymerization process. In addition to the interior surface walls of such tanks, the interior of such chemical processing tanks may contain baffles, crevices, agitators and agitator blades and the like, which also must be cleaned. Cleaning periodically is necessary so as to prevent contamination of succeeding polymerization batches and, additionally, to maintain a clean nonfouled interior wall surface providing for optimum heat transfer therethrough.

Cleaning of the interiors of such tanks is normally accomplished by manually scraping the interior walls, baffles and agitator blades in such tanks. Manual methods are time-consuming, ineffective for thorough cleaning due to the inherent deficiencies of a manual operation and additionally mars the wall surfaces as by inadvertently scratching the surface when using a scraper. More recently, hand lances utilizing high-pressure nozzles have been used to supplement the hand scraping to clean the interiors of tanks. However, an operator using a hand lance is essentially still a manual operation wherein the operator maneuvers the hand lance which maneuvering is rendered difficult by the length of such lances. Operating a hand lance outside the vessel makes it impossible to reach all interior surfaces within the vessel. A hand lance invariably creates a "fog" which further hampers the operator from observing the interior of the tank. Hand lances are difficult to maneuver and, due to the high pressure system, create an ever-present danger to operating personnel. Numerous safety procedures are necessary with manual operations, such as locking out the agitator motor and panel switch to render the agitators inoperable, connecting an exhaust hose to the tanks prior to cleaning and exhausting the interior thereof for at least twenty minutes to assure that the toxic fumes therein are all exhausted since such fumes are heavier than air, locking various valves and engaging safety alarms for the sole purpose of protecting operators working within and around the vessel. The operator has difficulty climbing into the tank requiring considerable effort and maneuvering. Accordingly, such manual cleaning methods employed are time-consuming, cumbersome and dangerous, and are further inadequate for providing the necessary clean surfaces within the vessels. These and other disadvantages are no longer encountered in practicing this invention.

The advantages realized with this invention are numerous. A manual cleaning operation is eliminated which avoids occupational hazards of operators and further eliminates inherent deficiencies of hand operations such as fatigue and carelessness. A portable cleaning device with a rotating jet-spray nozzle device is inserted into the tank and operates without operator manipulations, which device automatically adjusts and rotates within the tank so as to clean all interior surfaces.

SUMMARY OF THE INVENTION

In accordance with this invention a portable high-pressure jet-spray device with collapsible features is provided for rapidly and effectively cleaning interior surfaces of processing vessels. A plurality of rotating jet-nozzles are driven by gear means such that the rotating jet nozzles revolve through a predetermined geometric pattern for directing high pressure sprays to all surfaces within the tank.

To clearly illustrate this invention, reference will henceforth be made to the embodiment of this invention shown in the drawings.

DETAILED DESCRIPTION OF THE INVENTION

Figure 1:
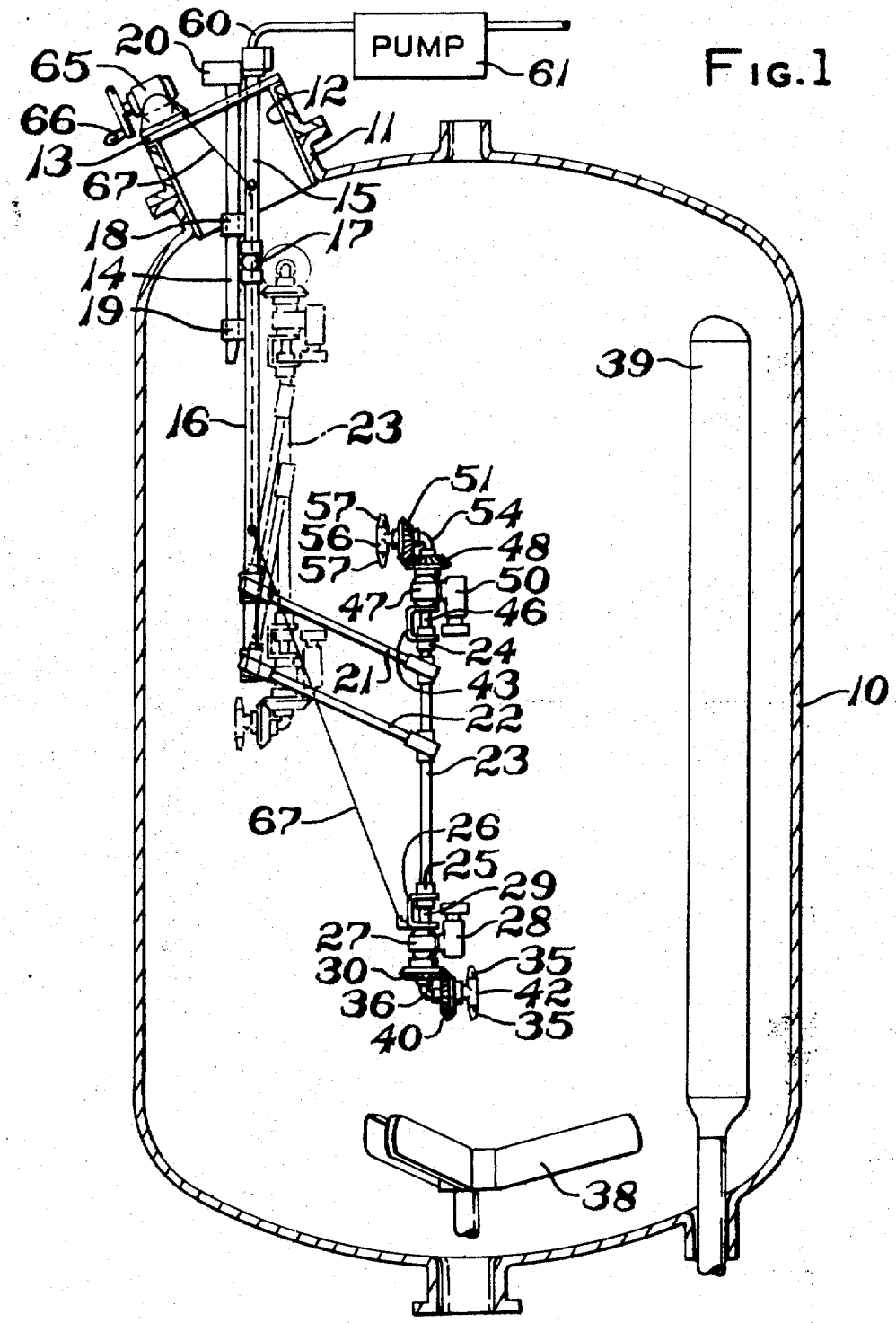
FIG. 1 is a side-elevation view of a jet-spray cleaning device within a tank.

Referring to the drawings wherein like reference characters designate like or corresponding parts throughout the several views, there is shown a tank or vessel 10 which receives the jet-cleaning apparatus to be described. The upper portion of vessel 10 has a circular flange 11 defining a man-hole 12 for entry into the inside of vessel 10. The portable jet-cleaning apparatus includes a support base or support means 13 which is suitably secured to the flange 11. Extending through support means 13 and suitably secured thereto is a first hollow support member 15. A second hollow support member 16 is suitably connected to the first support member 15 as by a swivel joint 17. The lower end portion of first support member 15 has a laterally extending bracket 18 secured thereto. The upper end portion of support member 16 has a laterally extending bracket 19 secured thereto in alignment with upper bracket 18. Brackets 18 and 19 have bores in alignment which receive a locking bar 14 which secures the respective support members 15 and 16 into a rigid structure. The upper end of locking bar 14 has a flanged portion 20 to facilitate the manipulation of the locking bar 14 relative to support members 15 and 16.

The lower end portion of support member 16 is pivotally attached to the one end of hollow cross members 21 and 22. The other ends of cross members 21 and 22 are further pivotally connected to a hollow manifold support member 23. Manifold support member 23 is movable upwardly and downwardly in vertical alignment and parallel to support member 16 during the extending and collapsing movement thereof in view of such support member 23 being pivotally attached to cross members 21 and 22. The manifold support member 23 has a rotary joint 24 secured to the upper end portion thereof and a rotary joint 25 secured to the lower end portion thereof. The upper and lower rotary joint 24 and 25 receive spray nozzles to be hereinafter described.

Suitably secured to lower rotary joint 25 is a torque bracket 26 which supports a hollow shaft speed reducer 27 and motive drive means or air motor 28. Operatively attached to lower rotary joint 25 is a pipe 29 which is journaled within speed reducer 27 for rotation thereby. A bevel gear 30 is suitably secured to the housing of a speed reducer 27. Pipe 29 has its lower end portion secured to one end of a right angle swivel joint 36 such that rotation of pipe 29 rotates right angle joint 36 and carries with it a lower bevel gear 40 about the vertical axis of pipe 29. Bevel gear 40, meshing with bevel gear 30, is journaled for rotation on the other end of the swivel joint 36 such that as bevel gear 40 is carried about the axis of pipe 29, bevel gear 40 rotates on its own axis. Secured to rotating bevel gear 40 for rotation therewith is a T-fitting 42. High pressure spray nozzles 35, 35 are secured to the end portions of T-fitting 42 to receive pressurized fluids from pipe 29 via swivel joint 36 for a purpose to be described.

In like manner, suitably secured to the upper rotary joint 24 of support member 23 is a torque bracket 43 which supports a hollow shaft speed reducer 47 and motive drive means or air motor 50. Operatively attached to upper rotary joint 24 is a pipe 46 which is journaled within speed reducer 47 for rotation thereby. A bevel gear 48 is suitably secured to the housing of a speed reducer 47. Pipe 46 has its upper end portion secured to one end of a right angle swivel joint 54 such that rotation of pipe 46 rotates right angle joint 54 and carries with it an upper bevel gear 51 about the vertical axis of pipe 46. Bevel gear 51, meshing with bevel gear 48 is journaled for rotation on the other end of swivel joint 54 such that as bevel gear 51 is carried about the vertical axis of pipe 46, bevel gear 52 rotates on its own axis. Secured to rotating bevel gear 51 for rotation therewith is a T-fitting 56 which supports spray nozzles 57, 57.

Extending through hollow support members 15 and 16 is a flexible conduit 60 which is suitably connected to a fluid supply source for supplying fluid to hollow cross members 21 and 22. Hollow cross members 21 and 22 are connected to manifold support member 23 which transports fluid to spray nozzles 57, 57 and 35, 35. If desired, conduit 60 may be connected via separate conduits in cross members 21 and 22 and through support member 23 for the delivery of fluids to nozzles 57, 57 and 35, 35. Conduit 60 is connected to a high pressure pump 61 which receives its supply of fluid such as water from a suitable source.

Upon activation of air motors 28 and 50, rotation of upper spray nozzles 57, 57 and lower nozzles 35, 35 are effected through lower bevel gear 40 meshing with lower bevel gear 30. The number of teeth on stationary bevel gear 30 is different than the number of teeth on rotational bevel gear 40. As an example, lower stationary bevel gear 30 can have 105 teeth with a 16 diametrical pitch and a 20 degree pitch angle while bevel gear 40 can have 104 teeth with a 16 diametrical pitch and a 20 degree pitch angle. In such example, the geometric spray pattern of lower nozzles 35, 35 changes continuously upon one complete revolution of gear 40 such that the changing geometric pattern permits all interior surfaces of the vessel to have jet-spray directed thereto. In like manner, the upper stationary bevel gear 48 which engages upper bevel gear 51 has a plurality of gear teeth differing in number of gear teeth on bevel gear 48. Preferably, gear 51 has fewer gear teeth than the stationary gear 48. Thus, the upper spray nozzles 57, 57 also rotate in a continuously changing geometric pattern.

To facilitate the positioning and collapsing of the cleaning apparatus, a winch 65 operated by a handle 66 is suitably mounted on the support base 13 to dispense and retract a stainless steel wire 67. Wire 67 passes through a bore in the support means 13 and then downwardly through a bore in support member 15, through support member 16 and thence through a bore in support member 16 for connection to the lower torque bracket 26. Rotation of handle 66 will effect the winding or unwinding of steel wire 67 which raises or lowers the jet-spray assemblies as depicted by solid lines and phantom lines respectively as shown in FIG. 1.

In the operation of the apparatus described, assume that the jet-spray apparatus is in a collapsed position, as shown in phantom lines in FIG. 1, however, with the locking bar 14 out of engagement with brackets 18 and 19. The apparatus with the swivel joint 17 permits the manipulation of the lower portion thereof relative to the upper portion of the vessel and the clearance space above the vessel to faciliate the positioning of the lower portion thereof into the tank. Support base 13 is then positioned on the flange 11 and locking bar 14 is inserted through the support base 13 to engage brackets 18 and 19 to thereby stabilize support members 15 and 16. Handle 66 is then rotated to unwind steel wire 67 which lowers the jet-spray assembly to an expanded position as shown by solid lines in FIG. 1. Cleaning fluid is then pumped under high pressure of about 3000 to 6000 p.s.i. to conduit 60 which transmits the cleaning solution under high pressure to manifold support member 23. Manifold 23 then distributes the cleaning fluid under continued high pressure to jet-spray nozzles 35, 35 and 57, 57. Lower air motor 28 and upper air motor 50 are activated to rotate via lower speed reducer 27 and upper speed reducer 47 respectively nozzles 35, 35 and 57, 57 in a predetermined geometric pattern which covers the entire interior surfaces of the tank and the elements therein including the agitator 38 and baffle 39.

Figure 2:
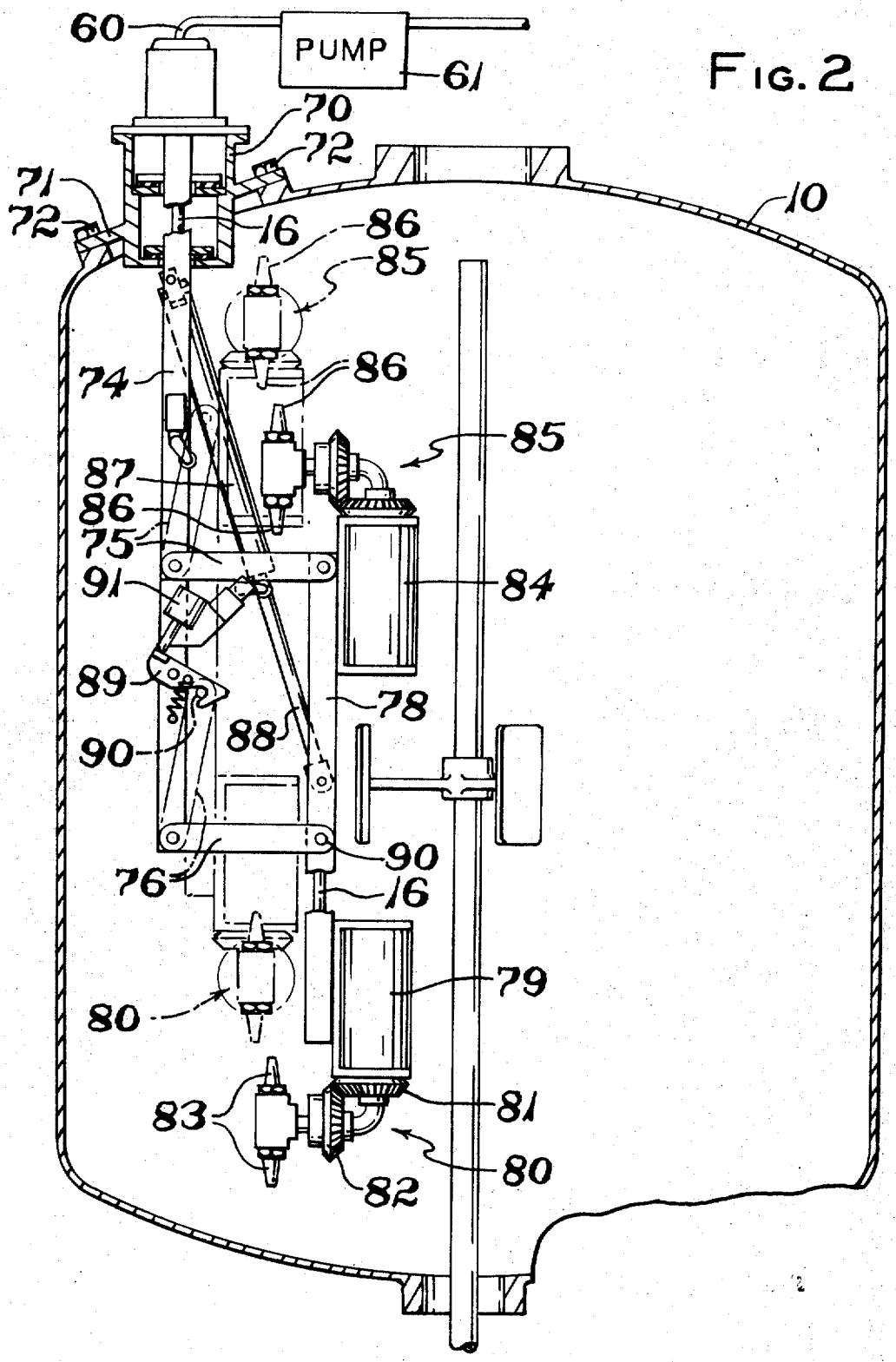
FIG. 2 is a side-elevation view of another embodiment of this invention.

A modification of the above-described embodiment as shown in FIG. 2 wherein a cylindrical support means 70 with a flanged portion 71 is suitably attached to the flanged opening of the tank as by bolts 72. Extending downwardly through support means 70 and supported by suitable bearings therein is a tubular support member 74. A pair of spaced cross members 75 and 76 have their one end portion pivotally secured to support member 74 and their other ends pivotally secured to tubular support member 78. Secured to the lower portion of tubular support member 78 is motor transmission means 79 which drives gear assembly 80 having a stationary bevel gear 81 meshing with bevel gear 82. Jet-spray nozzles 83, 83 are secured to the bevel gear 82 for rotation therewith as discussed in the first embodiment utilizing rotary joints or unions. As described therein bevel gear 82 has less teeth than gear 81 to provide the geometric cleaning pattern as discussed in the first embodiment. Alternatively, bevel gear 82 may have more teeth than gear 81.

An upper spray nozzle assembly 85 with jet-spray nozzles 86, 86 is operatively attached to the upper portion of tubular member 78 and operates essentially as spray nozzle assembly 83 and the spray nozzle assemblies of the first embodiment through motor transmission means 84.

The head end of a pneumatic cylinder 87 is suitably pivotally connected to support member 74 while the piston rod 88 thereof is pivotally connected to the intermediate portion of support member 78. Locking means comprising a spring biased latch 89 is operative to engage a pin 90 on cross member 76 to secure the apparatus in the collapsed position as shown by phantom lines in FIG. 2. A pneumatic cylinder 91, remotely operated, releases the latch 89 to permit the lowering of support member 78 relative to the support member 74. In the operation of this modification the high pressure jet-sprays are directed against the interior surfaces of vessels, the agitators, and deflectors which in combination with the changing geometric pattern of the rotating jet-spray nozzles as discussed in detail above effect a rapid and thorough cleaning therein. Substantial efficiency and operator safety are realized in addition to providing apparatus for thoroughly cleaning tank interiors.

Although a specific embodiment and a preferred mode of operation of the invention has been hereinbefore described, it is understood that the subject invention is not limited thereto since variations and modifications thereof can be made without departing from the principles of the invention.

We claim:

1. A portable apparatus for cleaning the interior of a vessel comprising: support means for resting upon the flange of an opening of a vessel and for attachment to the flange of the vessel; at least a pair of elongated support members supported by said support means for positioning into the interior of the vessel; power means interconnecting [(operatively connected to)] said support members for extending and retracting one of said elongated support members relative to the other of said elongated support members to [(facilitate)] collapse said members into a compact unit for removal and insertion of said portable cleaning apparatus into the vessel; spray nozzle means mounted on *said* one [said] support [members] *member* for rotation thereon; conduit means on said portable apparatus connected to said spray nozzle for delivering high pressure cleaning fluid to said spray nozzle means; and motive drive means mounted on said one member and connected to said spray nozzle means for rotating said spray nozzle means through a changing pattern of movement.

2. A portable apparatus for cleaning the interior of a vessel as set forth in claim 1 wherein said spray nozzle means is rotatable about a pair of axes that are perpendicular to each other.

3. A portable apparatus for cleaning the interior of a vessel as set forth in claim 1 wherein said spray nozzle means and said motive drive means include spray nozzles mounted on a first bevel gear, *said first bevel gear being rotated* [rotatable] about a first axis and *meshing with* [driven by] a second *stationary* bevel gear [rotatable] *providing rotation of said first bevel gear* about a second axis; and wherein said second bevel gear has a plurality of teeth differing in number than said first bevel gear.

4. A portable apparatus for cleaning the interior of a vessel as set forth in claim 3 including pump means operatively attached to said conduit means for supplying fluid thereto at pressures of greater than 3000 p.s.i.

5. A portable apparatus for cleaning the interior of a vessel as set forth in claim 4 wherein said other support member comprises a pair of longitudinally extending hollow tubes that are interconnected by a universal joint to facilitate the placement of said portable apparatus into said vessel and each of said hollow tubes includes a bracket that cooperates with a locking bar to maintain said tubes in fixed relationship.

6. A portable apparatus for cleaning the interior of a vessel as set forth in claim 1 wherein said power means includes a hydraulic cylinder means mounted on one of said pairs of support members and is operative to extend and retract said one support member relative to the other of said support members.

7. A portable apparatus for cleaning the interior of a vessel as set forth in claim 1 wherein pump means is operatively connected to said conduit means for supplying fluid thereto at pressures between 3000 p.s.i. and 6000 p.s.i.

8. A portable apparatus for cleaning the interior of a vessel comprising: support means for attachment to the vessel; a first support member mounted on said support means; a second support member pivotally connected to said first support member; a third hollow support member pivotally connected by cross members to said second support member; power means operatively connected to said support members for extending and retracting said third support members relative to said second support members to facilitate the removal and insertion of said portable cleaning apparatus into the vessel; locking means securing said first and second support members together; spray nozzle means mounted on said third support members for rotation thereon; conduit means on said portable apparatus connected to said spray nozzle for delivering high pressure cleaning fluid to said spray nozzle means; and motive drive means connected to said spray nozzle means *for rotating said spray nozzle means* about a pair of axes that are perpendicular to each other.

9. A portable cleaning apparatus for cleaning the interior of a vessel as set forth in claim 8 wherein said spray nozzle means includes a pair of spaced nozzle assemblies mounted on said third support member; each of said nozzle assemblies having *a rotary union means rotatable about a first axis; a first bevel gear secured to said third member; a second bevel gear mounted on said rotary union for movement therewith and rotation thereon about a second axis, said first and said second axis being normal to each other; said* [a first bevel gear journaled for rotation thereon and a] second bevel gear meshing with said first bevel gear; a pair of spray nozzles mounted on said second bevel gear *for rotation therewith; said* rotary union means interconnecting said spray nozzles with said conduit means for delivery of high pressure cleaning fluid to said spray *nozzles* [nozzle means]; said second bevel gear having a less number of teeth than said first bevel gear; and said motive drive means being connected to said [first bevel gear] *rotary union to rotate said rotary union and said spray nozzles about said first axis and rotate said second gear and spray nozzles about said second axis.*

References Cited

The following references, cited by the Examiner, are of record in the patented file of this patent or the original patent.

UNITED STATES PATENTS

| | | | |
|---|---|---|---|
| 2,029,795 | 2/1936 | Richard | 239—227 |
| 2,074,052 | 3/1937 | George | 239—227 |
| 2,574,206 | 11/1951 | Browning | 239—227 X |
| 2,773,721 | 12/1956 | Pedrick | 239—227 X |
| 3,001,534 | 9/1961 | Grant, Jr. | 239—227 X |
| 3,153,510 | 10/1964 | Brannfors et al. | 239—165 X |

ALLEN N. KNOWLES, Primary Examiner

M. MAR, Assistant Examiner

U.S. Cl. X.R.

134—168; 239—247, 265